UNITED STATES PATENT OFFICE.

GOTTLIEB HEILENMAN, OF LOUISVILLE, KENTUCKY.

YEAST.

SPECIFICATION forming part of Letters Patent No. 690,279, dated December 31, 1901.

Application filed February 27, 1901. Serial No. 49,167. (No specimens.)

*To all whom it may concern:*

Be it known that I, GOTTLIEB HEILENMAN, a citizen of the United States, residing at Louisville, in the county of Jefferson and State of Kentucky, have invented a new and useful Yeast, of which the following is a specification.

This invention relates to yeast, and more particularly to that class known as "yeast-flour;" and it has for its object to provide a salt-rising yeast which may be easily compounded, will be cheap, and will be a most efficient compound.

The yeast-flour consists of cornmeal, potato-flour, bicarbonate of soda, common salt or sodium chlorid, and anise-flour, also sugar.

In the manufacture of one pound of the yeast-flour I take of cornmeal twelve ounces; potato-flour, two ounces; bicarbonate of soda, one-half ounce; salt, one-half ounce; sugar, one-half ounce, and anise-flour one-half ounce, which ingredients are mixed thoroughly by sifting a number of times together. When the ingredients are thoroughly commingled, the compound is ready for use.

When the yeast is to be used, it is placed in a jar and boiling water is stirred into it, the water being added in the proportion of three quarts to one pound of yeast. A cover is then tied snugly over the jar, and it is permitted to stand from twelve to fourteen hours in a temperature of from 90° to 100°. The cover is then removed, and the contents of the jar is stirred thoroughly with a wooden spoon, after which it is again covered and allowed to stand for two hours. The yeast is then ready to be added to the ingredients of the bread to be baked.

In practice the specific proportions given may be varied slightly without departing from the spirit of the invention.

What is claimed is—

1. A yeast consisting of cornmeal, potato-flour, sodium bicarbonate, sodium chlorid, sugar, and anise-flour.

2. A yeast comprising the ingredients and proportions, substantially as follows; cornmeal twenty-four parts, potato-flour four parts, and one part each of sodium bicarbonate, salt, sugar and anise-flour.

In testimony that I claim the foregoing as my own I have hereto affixed my signature in the presence of two witnesses.

GOTTLIEB HEILENMAN.

Witnesses:
 JOS. L. L. FLYNN,
 J. C. MARTIN.